United States Patent
Cheng et al.

(10) Patent No.: US 11,809,658 B2
(45) Date of Patent: Nov. 7, 2023

(54) DRIVING CIRCUIT OF DISPLAY AND OPERATION METHOD OF A TIMING CONTROLLER THAT DETERMINES A CURRENT OPERATING STATUS OF A TOUCH DRIVER ACCORDING TO A NUMBER OF SUB-FALLING EDGES OF AN INSTRUCTION SIGNAL

(71) Applicant: E Ink Holdings Inc., Hsinchu (TW)

(72) Inventors: Hsiao-Lung Cheng, Hsinchu (TW); Shu-Cheng Liu, Hsinchu (TW); Pei-Lin Tien, Hsinchu (TW); I-Shin Lo, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/581,828

(22) Filed: Jan. 21, 2022

(65) Prior Publication Data

US 2022/0291801 A1 Sep. 15, 2022

(30) Foreign Application Priority Data

Mar. 12, 2021 (TW) ................. 110108844

(51) Int. Cl.
*G06F 3/041* (2006.01)
*G09G 3/20* (2006.01)
(52) U.S. Cl.
CPC ...... *G06F 3/04166* (2019.05); *G06F 3/04184* (2019.05); *G09G 3/2092* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 6,738,514 B1 * | 5/2004 | Shin | G06V 30/373 382/187 |
| 9,442,615 B2 | 9/2016 | Reynolds | |
| 9,557,873 B2 | 1/2017 | Hayashi et al. | |
| 9,740,395 B2 | 8/2017 | Yamada et al. | |
| 10,134,349 B2 | 11/2018 | Zhang et al. | |

(Continued)

FOREIGN PATENT DOCUMENTS

| | | | |
|---|---|---|---|
| CN | 201556192 U | * | 8/2010 |
| CN | 202422066 U | * | 9/2012 |

(Continued)

OTHER PUBLICATIONS

"Office Action of Taiwan Counterpart Application", dated Feb. 10, 2022, p. 1-p. 3.

*Primary Examiner* — Kirk W Hermann
(74) *Attorney, Agent, or Firm* — JCIPRNET

(57) ABSTRACT

The driving circuit of the display includes a timing controller. The timing controller is coupled to a general purpose input/output (GPIO) pin of the touch driver. The timing controller receives an instruction signal via the general purpose input/output pin of the touch driver. The timing controller starts a detection period according to a main falling edge of the instruction signal. The timing controller determines a current operating status of the touch driver according to a number of sub-falling edges of the instruction signal during the detection period.

11 Claims, 3 Drawing Sheets

(56) References Cited

U.S. PATENT DOCUMENTS

| | | | |
|---|---|---|---|
| 2008/0184050 A1* | 7/2008 | Yamaji | G06F 9/4418 713/323 |
| 2014/0146010 A1* | 5/2014 | Akai | G06F 3/04166 345/174 |
| 2016/0188009 A1* | 6/2016 | Katsurahira | G06F 3/033 345/179 |
| 2016/0299585 A1* | 10/2016 | Lee | G06F 3/04162 |
| 2018/0315368 A1 | 11/2018 | Wen et al. | |
| 2018/0349667 A1* | 12/2018 | Kim | G09G 5/00 |
| 2019/0180677 A1 | 6/2019 | Hwang | |

FOREIGN PATENT DOCUMENTS

| | | | | | |
|---|---|---|---|---|---|
| CN | 203689492 U | * | 7/2014 | | |
| CN | 104598078 A | * | 5/2015 | | G06F 3/0416 |
| CN | 105469770 | | 4/2016 | | |
| CN | 106997255 | | 8/2017 | | |
| CN | 212845450 U | * | 3/2021 | | |
| KR | 19990086521 A | * | 12/1999 | | |
| KR | 20170119320 A | * | 10/2017 | | |
| TW | 201349052 | | 12/2013 | | |
| TW | 201541310 | | 11/2015 | | |
| TW | 201710847 | | 3/2017 | | |
| TW | 201710847 A | * | 3/2017 | | |
| WO | WO-2021056364 A1 | * | 4/2021 | | |

\* cited by examiner

DRIVING CIRCUIT OF DISPLAY AND OPERATION METHOD OF A TIMING CONTROLLER THAT DETERMINES A CURRENT OPERATING STATUS OF A TOUCH DRIVER ACCORDING TO A NUMBER OF SUB-FALLING EDGES OF AN INSTRUCTION SIGNAL

CROSS-REFERENCE TO RELATED APPLICATION

This application claims the priority benefit of Taiwan application serial no. 110108844, filed on Mar. 12, 2021. The entirety of the above-mentioned patent application is hereby incorporated by reference herein and made a part of this specification.

BACKGROUND

Technical Field

The disclosure relates to a circuit and an operation method, and in particular to a driving circuit of a display and an operation method of a timing controller.

Description of Related Art

Regarding a conventional electronic paper display (E-paper display) with a touch function, during the period when an electrophoretic display (EPD) of the E-paper display is not updated, due to display characteristics of the EPD, a timing controller (TCON) configured to drive the EPD may switch from a working mode to a power saving mode. When the EPD of the electronic E-paper display is updated, the TCON does not immediately switch from the power saving mode to the working mode, but waits for a host processing unit of an electronic device equipped with the E-paper display to parse touch data provided by a touch driver. Then, the host processing unit decides whether to notify or wake up the TCON to switch from the power saving mode to the working mode. In other words, in the process of the conventional E-paper display with a touch function displaying a touch result (such as displaying touch traces) through an EPD, the conventional E-paper display has to wait for the parsing of the touch data, so the conventional E-paper display cannot provide a real-time result of a display change corresponding to a touch operation, leading to a poor user experience. In view of the above, several embodiments will be proposed in the following as solutions.

SUMMARY

The disclosure provides a driving circuit of a display and an operation method of a timing controller (TCON). In the disclosure, a display panel can be quickly drivel to display a corresponding content according to the type of touch operation on the display touch panel.

The driving circuit of the display of the disclosure includes a TCON. The TCON is coupled to a general purpose input/output pin (GPIO pin) of a touch driver. The TCON receives an instruction signal via the GPIO pin of the touch driver. The TCON starts a detection period according to a main falling edge of the instruction signal. The TCON determines a current operating status of the touch driver according to a number of sub-falling edges of the instruction signal during the detection period.

The operation method of a TCON in the disclosure includes the following. An instruction signal is received via a GPIO pin of a touch driver. A detection period is started according to a main falling edge of the instruction signal. A current operating status of the touch driver is determined according to a number of sub-falling edges of the instruction signal during the detection period.

Based on the above, by using the driving circuit of the display and the operation method of the TCON of the disclosure, the current operating status of the touch driver is quickly determined through the TCON directly receiving the instruction signal provided by the touch driver, and whether to enter the working mode in advance is thus effectively determined.

To further describe the above features and advantages of the disclosure, embodiments accompanied with drawings are described below in details.

DESCRIPTION OF THE EMBODIMENTS

Figure 1:
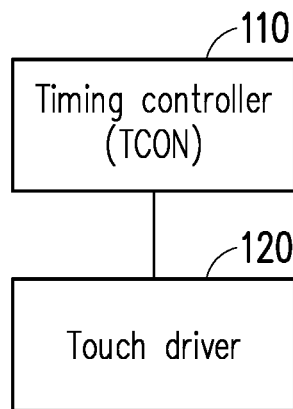
FIG. 1 is a schematic diagram of a timing controller and a touch driver according to an embodiment of the disclosure.

To further describe the content of the disclosure, multiple embodiments are proposed below to describe the disclosure. However, the disclosure is not limited to the embodiments. Appropriate combination of embodiments is also allowed. In addition, wherever possible, elements/components/steps with the same reference numbers in the drawings and embodiments represent the same or similar components.

FIG. 1 is a schematic diagram of a timing controller and a touch driver according to an embodiment of the disclosure. Referring to FIG. 1, a timing controller (TCON) 110 of this embodiment may be coupled (directly coupled) to a general purpose input/output pin (GPIO pin) of a touch driver 120, and receive an instruction signal provided (or generated) by the touch driver 120 through the GPIO pin. In this embodiment, the TCON 110 may be further coupled to a display, for example an electrophoretic display (EPD), and the touch driver 120 may be further coupled to a touch panel. The EPD may be integrated with the touch panel to realize an electronic paper display (E-paper display) with a touch function. In this embodiment, when the EPD displays a static picture, for example, the TCON 110 may operate in a power saving mode (or a sleep mode). In some embodiments of the disclosure, the TCON 110 may not output a driving signal (with a special signal waveform) to the EPD in the power saving mode. In addition, in other embodiments of the disclosure, it may take a while for the ICON 110 to switch from the power saving mode to the working mode.

When a touch operation occurs on the touch panel, in order for the EPD to quickly display the content corresponding to the touch operation (for example, to display the touch traces), the ICON 110 of this embodiment needs to switch to operating in the working mode to output multiple drive signals to multiple electrophoretic units of the EPD according to display drive data corresponding to the touch operation. In this regard, before the ICON 110 of this embodiment receives the display driver data corresponding to the touch operation, the ICON 110 may first quickly determine the current operating status of the touch driver in advance according to the instruction signal provided (or generated) by the touch driver 120 received from the GPIO pin, in order to decide whether to enter the working mode in advance. Therefore, when the ICON 110 does receive the display drive data corresponding to the touch operation, the ICON 110 that has entered the working mode in advance may quickly drive the E-paper display to display the corresponding content according to the display drive data immediately.

Figure 2:
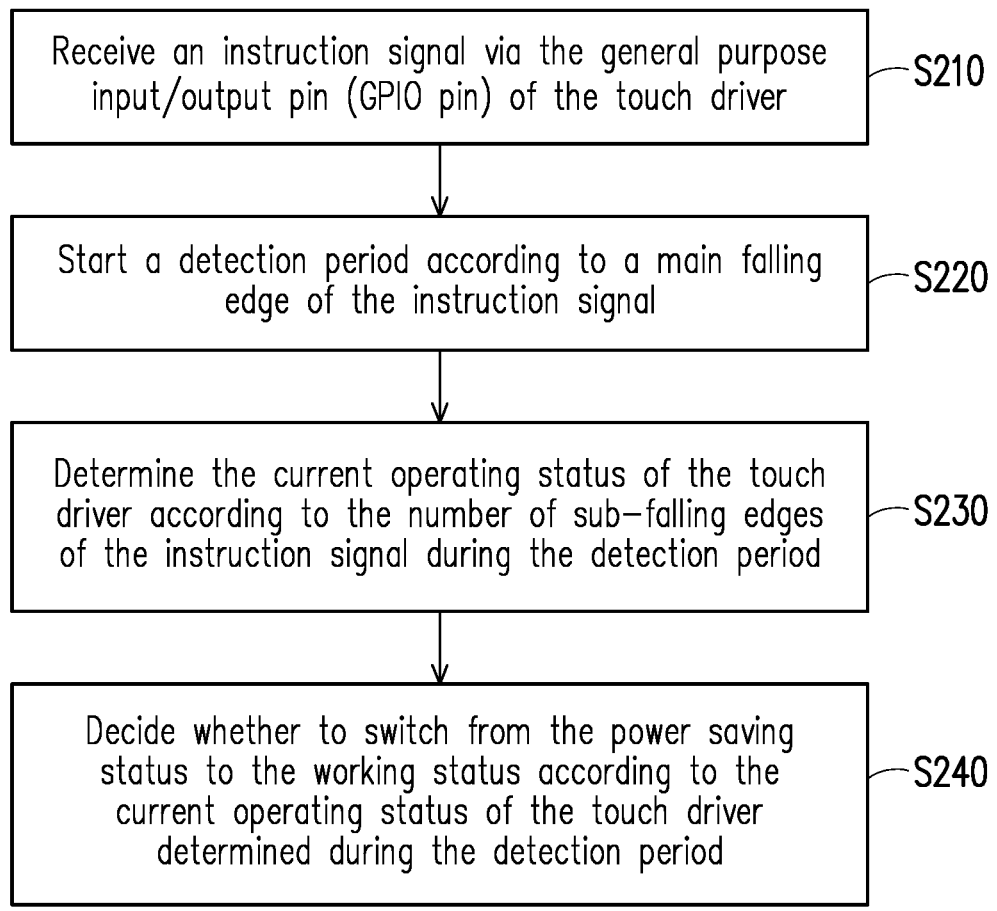
FIG. 2 is a flow chart of an operation method of the timing controller according to an embodiment of the disclosure.

FIG. 2 is a flow chart of an operation method of the timing controller according to an embodiment of the disclosure. Referring to FIGS. 1 and 2, the ICON 110 of FIG. 1 may perform the following steps S210 to S240. In step S210, the ICON 110 may receive an instruction signal via the GPIO pin of the touch driver 120. In step S220, the ICON 110 may start a detection period according to a main falling edge of the instruction signal. In this embodiment, when no touch operation occurs on the touch driver 120, the instruction signal may be maintained at a high voltage level. When a touch operation occurs on the touch driver 120, the instruction signal may be switched to a low voltage level. Therefore, the ICON 110 of this embodiment may start to detect the instruction signal through determining whether the signal waveform of the instruction signal has a main falling edge (switching from a high voltage level to a low voltage level), and the ICON 110 may perform detection in a detection period of a default (or fixed) length of time.

In step S230, the ICON 110 may determine the current operating status of the touch driver according to the number of sub-falling edges of the instruction signal during the detection period. In this embodiment, the touch driver 120 may provide the instruction signal including different numbers of pulse signals by default according to different touch operation types. Therefore, the ICON 110 of this embodiment may effectively calculate the number of pulse signals by detecting the number of sub-falling edges of the instruction signal during the detection period, and determine the current operating status of the touch driver 120 accordingly.

In step S240, the ICON 110 may decide whether to switch from the power saving status to the working status according to the current operating status of the touch driver 120 determined during the detection period. In this embodiment, the current operating status may be, for example, a pen writing status, a pen hovering status, or a finger touch status. In this regard, the ICON 110 of the embodiment may decide whether to enter the working mode in advance according to the current operating status of the touch driver 120 in advance. Alternatively, according to the current operating status of the touch driver 120, the ICON 110 may perform a pre-drive operation in advance before outputting a corresponding drive signal. Therefore, when the ICON 110 does receive the display driving data corresponding to the touch operation, the ICON 110 may quickly drive the E-paper display to display the corresponding content.

Figure 3:
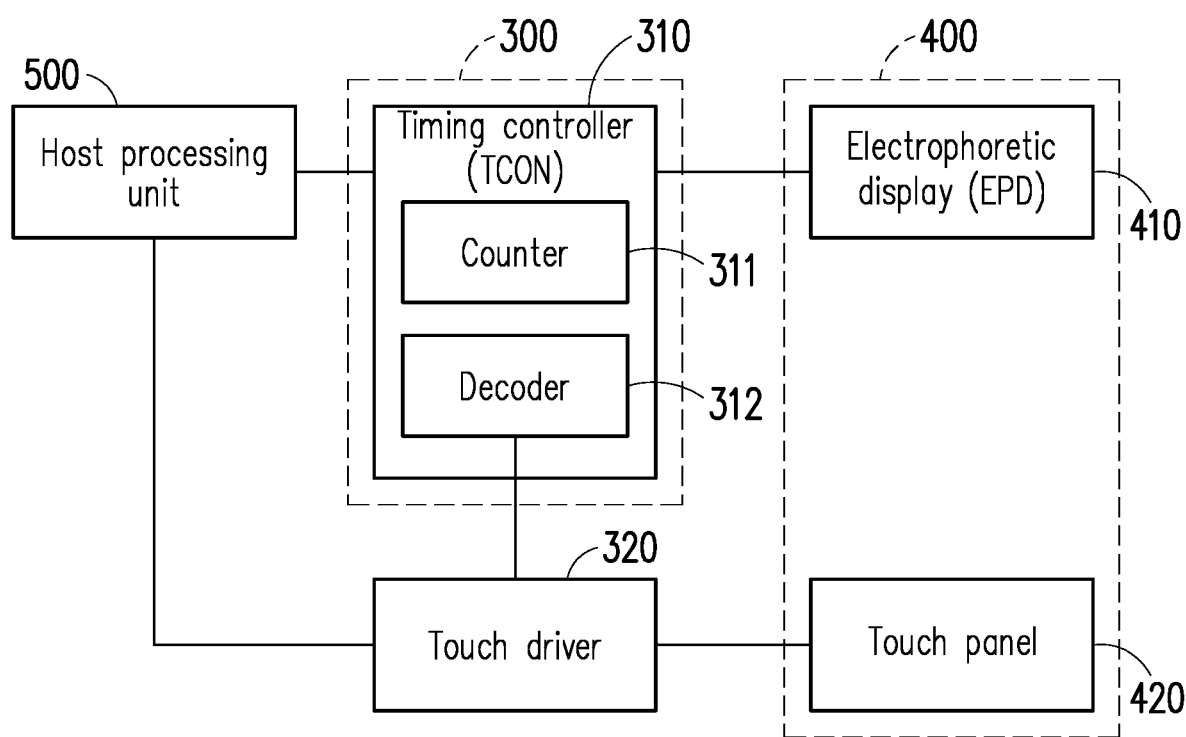
FIG. 3 is a schematic diagram of an electronic device according to an embodiment of the disclosure.
Figure 4:
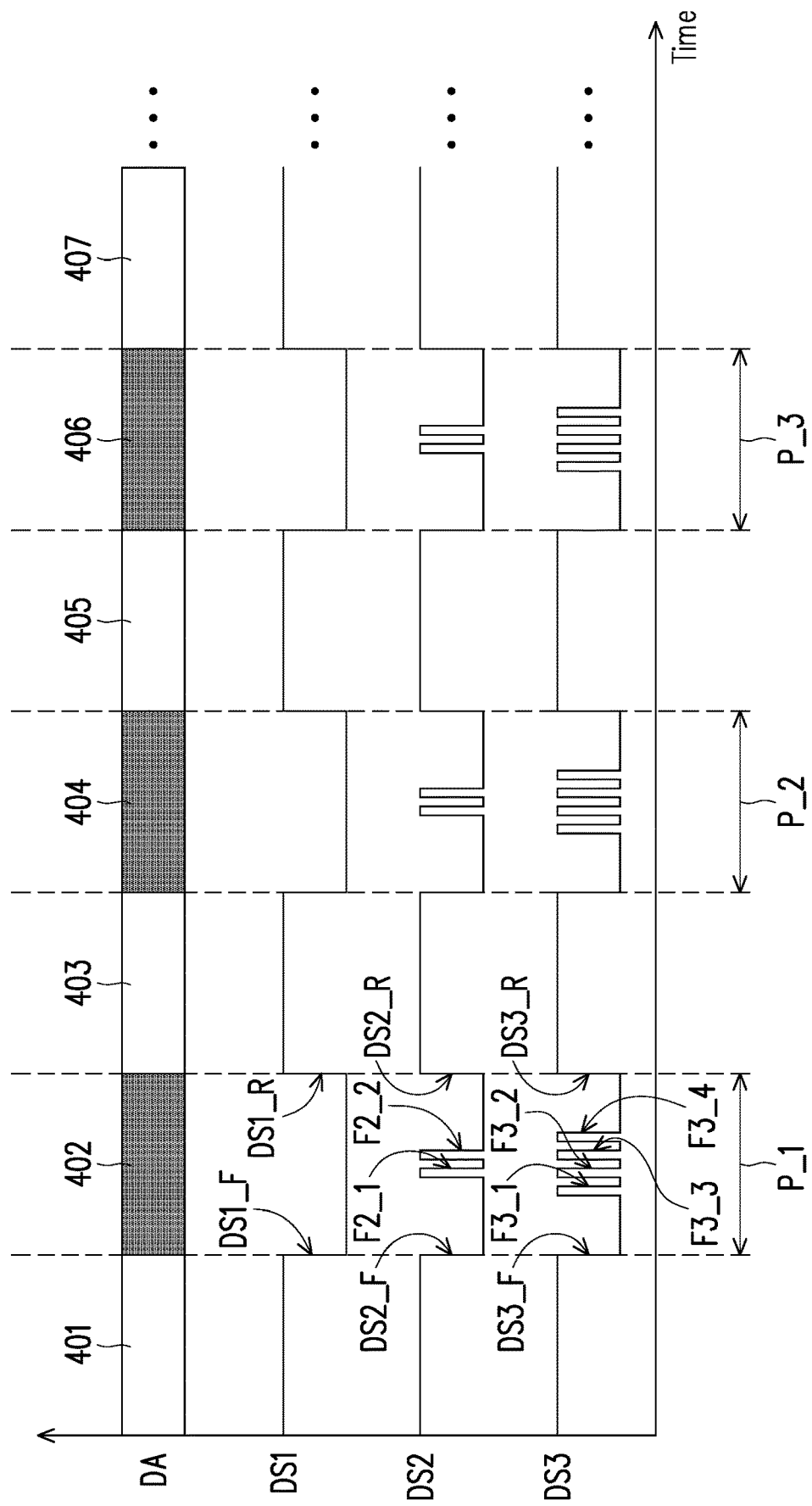
FIG. 4 is a signal timing chart of an instruction signal according to an embodiment of the disclosure.

FIG. 3 is a schematic diagram of an electronic device according to an embodiment of the disclosure. FIG. 4 is a signal timing chart of an instruction signal according to an embodiment of the disclosure. Referring to FIGS. 3 and 4, an electronic device 30 may include a driving circuit 300, a touch driver 320, an E-paper display 400, and a host processing unit 500. In this embodiment, the electronic device 30 may be, for example, a tablet or other similar computer apparatuses or display apparatuses. The host processing unit 500 may be, for example, a central processing unit (CPU) or a system on a chip (SoC) of a tablet. In this embodiment, the driving circuit 300 includes a ICON 310.

In other embodiments, the touch driver 320 may be integrated in the driving circuit 300. In this embodiment, the E-paper display 400 may be integrated with an EPD 410 and a touch panel 420. The TCON 310 is coupled to the touch driver 320, the EPD 410 and the host processing unit 500. The TCON 310 is configured to drive the EPD 410. The touch driver 320 is coupled to and configured to drive the touch panel 420. The TCON 310 further includes a counter 311 and a decoder 312. In this embodiment, the touch driver 320 may be connected to the host processing unit 500 via a universal serial bus (USB) interface or an inter-integrated circuit (I2C) interface, for example. In other embodiments of the disclosure, the E-paper display 400 may be other types of displays, such as a liquid crystal display or organic electroluminescent displays. Therefore, the electrophoretic display (EPD) 410 may also be, for example, a liquid crystal display panel or an organic electroluminescent display panel.

In this embodiment, the TCON 310 may be coupled to the GPIO pin of the touch driver 320 and may be configured to receive an instruction signal via the GPIO pin of the touch driver 320. The GPIO pin may be an interrupt pin. In this embodiment, the TCON 310 and the touch driver 320 are only connected through the GPIO pin. However, in other embodiments, a USB interface or an I2C interface for transmitting touch data may be included between the TCON 310 and the touch driver 320. In this embodiment, when a user performs a touch operation on the touch panel 420 of the E-paper display 400, the touch panel 420 may determine whether the user touches with a stylus or a finger or use the stylus to hover above the touch panel 420, so as to correspondingly output different instruction signals (instruction signals DS1, DS2, DS3 as shown in FIG. 4) to the TCON 310, and output the corresponding touch data (a touch data transmission timing DA as shown in FIG. 4) to the host processing unit 500.

In this embodiment, the touch data transmission timing DA is in a no signal or no data transmission status in time intervals 401, 403, 405, and 407, and is in a data transmission status in time intervals 402, 404, and 406. The touch driver 320 may periodically output touch data to the host processing unit 500. In this regard, corresponding to the user touching the touch panel 420 with a stylus or a finger, or using the stylus to hover above the touch panel 420, the touch driver 320 may output corresponding touch data. The touch data is, for example, in a USB data format or an I2C data format. In other words, since the touch data conforms to the specification of a specific format and has a fixed (or minimum) data length, under the condition of a fixed transmission speed, the touch data transmission timing DA has a fixed time length in each time interval 402, 404, and 406 of transmitting data. For example, the touch data is in the I2C data format, and has a fixed (or minimum) data length of 11 bytes and each byte has an ACK (Acknowledge) bit. Therefore, under the condition of a fixed transmission speed, such as 400 KHz, 2.5 μs/per bit, the time length (99*2.5 μs=0.247 ms) of each time interval 402, 404, 406 may be fixed at 0.247 ms.

In this embodiment, when no touch operation occurs on the touch driver 320, the instruction signals DS1, DS2, and DS3 may be respectively maintained at high voltage levels. When a touch operation occurs on the touch driver 120, the instruction signals DS1, DS2, and DS3 may be respectively switched to low voltage levels. In this regard, in the time intervals 402, 404, and 406 corresponding to the touch data transmission timing DA, the touch driver 320 may synchronously switch the voltage level of one of the instruction signals DS1, DS2, and DS3 as shown in FIG. 4. In this regard, for example, the time intervals between main falling edges DS1_F, DS2_F, and DS3_F and main rising edges DS1_R, DS2_R, and DS3_R of the instruction signals DS1, DS2, and DS3 respectively shown in FIG. 4 are synchronized with the time interval 402 of the touch data transmission timing DA. It is worth noting that the touch driver 320 may be designed to allow the parts of the instruction signals DS1, DS2, and DS3 that correspond to the time intervals 402, 404, and 406 to have waveforms with different numbers of pulse signals according to different touch operations. In addition, the TCON 310 may perform a pulse signal detection on the received instruction signal (count the number of pulse signals) in multiple corresponding detection periods. The detection periods, for example, correspond to the periods between the main falling edges DS1_F, DS2_F, and DS3_F and the main rising edges DS1_R, DS2_R, and DS3_R after the main falling edges DS1_F, DS2_F, and DS3_F of the instruction signals DS1, DS2, and DS3 of the instruction signal.

Taking the instruction signal DS1 as an example, the instruction signal DS1 output by the touch driver 320 through the GPIO pin may correspond to a pen writing status occurring on the touch panel 420; that is, the user writes on the touch panel 420 through a stylus. When the TCON 310 operates in the power saving mode in advance, and the TCON 310 detects the main falling edge DS1_F (first time) of the instruction signal DS1, the counter 311 of the TCON 310 starts counting a counting period P_1, and the TCON 310 synchronously performs a detection, and the detection period during which the TCON 310 performs the detection is synchronized with the counting period P_1. The counter 311 of the TCON 310 stops counting when the TCON 310 detects the main rising edge DS1_R of the instruction signal DS1. In the counting period P_1 in this example, the TCON 310 may detect the number of sub-falling edges during the detection period (the counting period P_1) to determine the current operating status of the touch driver 320. An example of a specific implementation method is as follows. The decoder 312 of the TCON 310 decodes a digital signal generated by the TCON 310 according to the number of sub-falling edges, so that the TCON 310 determines the current operating status of the touch driver 320 according to a decoded signal output by the decoder 312. In this regard, according to the number of sub-falling edges occurring during the detection period (the counting period P_1) of the instruction signal DS1 being 0 times, the TCON 310 may determine that the current operating status of the touch driver 320 is the pen writing status. Therefore, the TCON 310 may automatically switch from the power saving status to the working status, and may be pre-driven corresponding to a corresponding display content to be performed in the pen writing status of the touch driver 320. In addition, by analogy, the TCON 310 operates corresponding detection and determination on the instruction signal DS1 during a counting period P_2 and a counting period P_3.

Taking the instruction signal DS2 as an example, the instruction signal DS2 output by the touch driver 320 through the GPIO pin may correspond to the pen hovering status occurring on the touch panel 420; that is, the user uses a stylus to hover above the touch panel 420 (within a default range from the touch panel 420, but not touching the touch panel 420). Therefore, when the TCON 310 operates in the power saving mode in advance, and the TCON 310 detects the main falling edge DS2_F (first time) of the instruction signal DS2, the counter 311 of the TCON 310 starts counting the counting period P_1, and the TCON 310 synchronously performs a detection, and the detection period during which the TCON 310 performs a detection is synchronized with the counting period P_1. In the counting period P_1 in this example, the TCON 310 may detect the number of sub-falling edges during the detection period (the counting period P_1) to determine the current operating status of the touch driver 320. In this regard, as shown by sub-falling edges F2_1 and F2_2 in FIG. 4, according to the number of sub-falling edges occurring during the detection period (the counting period P_1) of the instruction signal DS2 being a first number, for example, 2 times (the number of pulse signals is 2), the TCON 310 may determine that the current operating status of the touch driver 320 is the pen hovering status. Therefore, the TCON 310 may automatically switch from the power saving status to the working status, and may be pre-driven corresponding to a corresponding display content to be performed in the pen hovering status of the touch driver 320. In addition, by analogy, the TCON 310 operates corresponding detection and determination on the instruction signal DS2 during a counting period P_2 and a counting period P_3.

Taking the instruction signal DS3 as an example, the instruction signal DS3 output by the touch driver 320 through the GPIO pin may correspond to the finger touch status occurring on the touch panel 420; that is, the user touches the touch panel 420 with a finger (the finger may or may not move). Therefore, when the TCON 310 operates in the power saving mode in advance, and the TCON 310 detects the main falling edge DS3_F (first time) of the instruction signal DS3, the counter 311 of the TCON 310 starts counting the counting period P_1, and the timing controller TCON 310 synchronously performs a detection, and the detection period during which the ICON 310 performs the detection is synchronized with the counting period P_1. In the counting period P_1 in this example, the ICON 310 may detect the number of sub-falling edges during the detection period (the counting period P_1) to determine the current operating status of the touch driver 320. In this regard, as shown by sub-falling edges F3_1, F3_2, F3_3, and F3_4 in FIG. 4, according to the number of sub-falling edges occurring during the detection period (the counting period P_1) of the instruction signal DS3 being a second number, for example, 4 times (the number of pulse signals is 4), the ICON 310 may determine that the current operating status of the touch driver 320 is the finger touch status. Therefore, the ICON 310 may automatically switch from the power saving status to the working status, and may be pre-driven corresponding to a corresponding display content to be performed in the finger touch status of the touch driver 320. In addition, by analogy, the ICON 310 operates corresponding detection and determination on the instruction signal DS3 during a counting period P_2 and a counting period P_3.

Therefore, in the process of the touch driver 320 transmitting touch data to the host processing unit 500, the ICON 310 may automatically determine whether to switch from the power saving status to the working status in advance according to the instruction signal output by the GPIO pin of the touch driver 320. When the host processing unit 500 outputs corresponding display drive data to the ICON 310 according to the touch data, the ICON 310 may operate in the working status, and thus the ICON 310 may quickly drive the EPD 410 to display a corresponding display content. However, the number of pulse signals of each instruction signal in each counting period in the above examples is not limited to that shown in FIG. 4, and the number of pulse signals may be flexibly designed. In addition, the touch operation type corresponding to each instruction signal in the above examples is not limited to the above, and the touch operation type may be designed according to different touch operation requirements.

In summary, in the driving circuit of the display and the operation method of the timing controller (TCOM) of the disclosure, through coupling the TCOM to the GPIO pin of the touch driver, the ICON may quickly determine the current operating status of the touch driver directly according to the instruction signal provided by the touch driver, and enter the working mode in advance. Therefore, when the ICON receives the display driver data corresponding to a touch operation, the ICON may quickly drive the display to display a corresponding content, thereby providing a good user experience.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the scope of protection of the disclosure is defined by the scope of the appended claims.

What is claimed is:

1. An operation method of a timing controller, comprising:
   receiving an instruction signal via a general purpose input/output pin of a touch driver;
   starting a detection period according to a main falling edge switched from a first voltage level to a second voltage level of the instruction signal;
   detecting a number of sub-falling edges of pulse signals of the instruction signal; and
   determining a current operating status of the touch driver according to the number of sub-falling edges of the instruction signal during the detection period,
   wherein the timing controller determines that the current operating status of the touch driver is a first writing status according to the number of sub-falling edges of the instruction signal during the detection period being 0.

2. The operation method of a timing controller according to claim 1, wherein the first writing status is a pen writing status.

3. A driving circuit of a display, comprising:
   a timing controller, coupled to a general purpose input/output pin of a touch driver, configured to receive an instruction signal via the general purpose input/output pin of the touch driver,
   wherein the timing controller starts a detection period according to a main falling edge switched from a first voltage level to a second voltage level of the instruction signal, the timing controller detects a number of sub-falling edges of pulse signals of the instruction signal, and the timing controller determines a current operating status of the touch driver according to the number of sub-falling edges of the instruction signal during the detection period,
   wherein the timing controller determines that the current operating status of the touch driver is a first writing status according to the number of sub-falling edges of the instruction signal during the detection period being 0.

4. The driving circuit of a display according to claim 3, wherein the timing controller comprises:
   a counter, configured to start a counting period when the timing controller detects the main falling edge of the instruction signal, wherein the detection period is synchronized with the counting period.

5. The driving circuit of a display according to claim 3, wherein the timing controller determines that the current operating status of the touch driver is a pen hovering status according to the number of sub-falling edges of the instruction signal during the detection period being a first number.

6. The driving circuit of a display according to claim 3, wherein the timing controller determines that the current operating status of the touch driver is a finger touch status according to the number of sub-falling edges of the instruction signal during the detection period being a second number.

7. The driving circuit of a display according to claim 3, wherein the detection period corresponds to a period between the main falling edge and a main rising edge after the main falling edge of the instruction signal.

8. The driving circuit of a display according to claim 3, wherein the timing controller decides whether to switch from a power saving status to a working status according to the current operating status of the touch driver determined during the detection period.

9. The driving circuit of a display according to claim 3, wherein the timing controller comprises:
   a decoder, configured to decode a digital signal generated by the timing controller according to the number of sub-falling edges to allow the timing controller to determine the current operating status of the touch driver according to a decoded signal output by the decoder.

10. The driving circuit of a display according to claim 3, wherein the general purpose input/output pin is an interrupt pin.

11. The driving circuit of a display according to claim 3, wherein the first writing status is a pen writing status.

* * * * *